United States Patent [19]

Wolf et al.

[11] Patent Number: 4,482,136
[45] Date of Patent: Nov. 13, 1984

[54] ELASTOMERIC LOOP

[75] Inventors: Franz-Josef Wolf, Bad Soden-Salmünster; Hubert Pletsch, Birkenau; Gregoire Benneyan, Bad Soden-Salmünster, Fed. Rep. of of Germany

[73] Assignee: WOCO Franz-Josef & Co., Bad Soden-Salmenster, Fed. Rep. of Germany

[21] Appl. No.: 394,196

[22] Filed: Jul. 1, 1982

[30] Foreign Application Priority Data

Aug. 25, 1981 [DE] Fed. Rep. of Germany ....... 3133545

[51] Int. Cl.³ ............................................. F16F 3/08
[52] U.S. Cl. .................................. 267/152; 188/268; 248/621

[58] Field of Search ............... 188/266, 268; 248/565, 248/584, 589, 621; 267/22 R, 48, 140.4, 143, 151, 152, 141

[56] References Cited

U.S. PATENT DOCUMENTS 75,814   3/1868  Turner ........................ 267/152 X
1,850,289  3/1932  Saurer ........................ 267/141 X

FOREIGN PATENT DOCUMENTS 54738  4/1980  Japan .

Primary Examiner—Duane A. Reger
Attorney, Agent, or Firm—Jordan and Hamburg

[57] ABSTRACT

An elastomeric loop used as a suspension device, for example for suspending exhaust systems of motor vehicles, includes a closed loop of elastomeric material in which a link chain is embedded, whereby the link chain improves the suspension characteristics of the suspension device.

15 Claims, 3 Drawing Figures

ELASTOMERIC LOOP

BACKGROUND OF THE INVENTION

This invention relates to an annular, elastomeric loop for effecting suspension of various parts, for example, exhaust systems parts, of motor vehicles.

An annular elastomeric loop for effecting suspension in the sense of the invention is a closed loop or ring, closed within itself, which does not have to have an absolutely circular shape, that has in principle any cross section, and wherein the closed loop or ring, consisting substantially of an elastomer, serves to accept, dampen and buffer traction forces which may arise between two constructional parts or machine parts that are limited in their motions relative to each other.

Elastomeric loops of this kind find use in the field of machine construction for suspending various components that are exposed to vibrations or impact stresses, for instance for the suspending of tables, pipes or conduits. For example, exhaust pipes and mufflers and whole exhaust systems are suspended by such elastomeric loops onto supports which are solidly fastened to the chassis or the body of motor vehicles.

Such known elastomeric loops consisting exclusively of an elastomer, have too flat a spring characteristic curve and a short life expectancy. The too low grade of progression of the spring characteristic curve, particularly over large paths, causes at peak loads, particularly impact load peaks that the impacted constructional part describes, a relatively large lift relative to the bearing constructional part and is brought back towards the bearing construction part with relatively large acceleration when the load is removed. This happens when elastomeric loops for suspending are used consisting exclusively of an elastomer, the dimensions of the loops following economical precepts. Such aforementioned overly-large spring paths at limit loads lead to bumping and knocking of the parts against each other, thus to a considerable diminution of the service life of the elastomeric loop.

Therefore, it is known to reinforce such elastomeric loops with inserts. Textile fabrics (Federal Republic of Germany Pat. No. 15 05 498 C3) or spring steel (Federal Republic of Germany Pat. No. 26 58 358 C3) are used as reinforcing materials. The desired progression of the spring characteristic curve cannot be obtained by textile reinforcements, at least by far not as much as desired. Furthermore, the elastomeric loops, reinforced with textile inserts have an insufficient thermal stability of the characteristic spring curve. Such a thermal stability of the course of the characteristic spring curve is, though, important in many fields of use, for instance when suspending exhaust pipes in motor vehicle construction. When using a spring steel band as an insert for elastomeric loops of a suspension, practical experience has shown that particularly oscillatory loads burden the spring band insert frequently up to the limiting area of spring extension. That leads to comparatively fast fatigue of the material and quite often to breaking of the spring steel band.

Other experiments known from practice to reinforce the elastomeric loop by aid of inelastical or only slightly extendable reinforcing inserts have neither led to any success. The characteristic spring curves of such elastomeric loops show already in the region of proportionality and also following the proportionality region such a steep rise, that the desired dampening action of the elastomeric suspension is considerably weakened.

In view of this known state of the art, the invention has as an object to provide an annular elastomeric loop for a suspension, especially for suspension that dampens vibration and dampens sound, whose characteristic spring curve shows a proportionality region as broad and as flat as possible, and immediately adjacent to it a progression region changing into a steep rise of the characteristic spring curve.

In order to achieve this objective, the invention provides an elastomeric loop of the aforedescribed kind in which the elastomer is reinforced by an embedded link chain. A solid, adhering and positive connection exists between the link chain, or the individual links of the link chain, respectively and the elastomer which forms the ring cord of the elastomeric loop. The link chain or the link chain ring that is closed on itself and the elastomeric ring, respectively, thus form a homogeneous composite body. The link chain ring and the elastomeric ring are disposed at least substantially concentrical to each other or, respectively at least substantially coaxial with each other normal to the ring plane.

When the elastomeric ring is deformed, the angles between two adjacent links of the link chain change so that the links perform kinking motions relative to each other. Due to the fact that the links of the link chain are connected positively to the elastomer of the cord of the elastomeric loop, this kinking motion of the links of the link chain against each other concentrates the course of tension and the tension of deformation in the elastomer and amplifies it. This amplification and concentration results in an extension of the proportionality region of the spring characteristic curve, in other words the force-path-charcteristic line of the elastomeric loop, and this is followed by a steep rise of the spring characteristic curve after the aforementioned proportionality region. This steep rise is finally by itself limited by the tensile strength of the embedded link chain ring.

The substantial advantage of the elastomeric loop of the invention over comparable elastomeric loops with embedded textiles or spring steel bands lies in the practically completely long-lasting, fatigue-free continuous load capacity, particularly vibrational load capacity. Experiments have shown that the elastomeric loop lasts through millions of extension cycles up to the progression region of the spring characteristic curve completely undamaged, while at identical conditions, textile inserts have lost their effectiveness by stretching after less than 1 million extension cycles and likewise steel band inserts by breaking.

In principle, the link chain ring may be disposed peripherally or eccentrically relative to the core or the central or median line of the elastomeric ring cord. In most cases of use, the link chain ring is disposed preferably at least substantially coaxially to the central axis of the ring cord or is embedded therein, respectively, so that the elastomeric ring cord and the link chain ring, embedded therein, have substantially the same symmetry. The link chain ring is preferably completely surrounded by the elastomer even though this is not essential under all circumstances for attaining the objectives of the invention.

The elastomeric loop may have a toroidal configuration or the shape of an O-ring with a circular profile of the elastomeric cord particularly when used in the construction of motor vehicles and when used for the silencing mounting of a pipe.

The link chain embedded in elastomeric material may, in principle, consist of any material, as long as it is capable of forming a solid connection with the elastomer. The link chain may even consist of a synthetic resin when that is allowed by the tensile resistance expected from the elastomeric loop. Preferably, though, the link chain consists of steel. The connection between the steel links of the link chain or the link chain ring, respectively, may be improved by priming or by coating the link chain ring with an adhesion promoter as known in the art.

The surprising improvement of the service life of the elastomeric loop by embedding a link chain is caused by the fact that the link chain follows practically in any direction the deformations of the elastomer at the conditions of use due to its positive connection without showing by itself any fatigue or deterioration and moreover, particularly without losing its tensile strength in any way and thereby changing the limiting extensibility or tensile strength, respectively, of the whole elastomer. Therefore, the special construction of the link chain is in principle open to change as long as it does not reduce and impede the ductility of the elastomeric ring under conditions of use, but influences it only amplifyingly in the planned direction. The link chain embedded in the elastomeric cord according to the invention is preferably a bolt chain, particularly a stud chain or a bushing chain because these elastomeric loops are frequently stressed relative to their extension in the ring plane and are planned to accept such stresses.

The extensibility of the elastomeric ring in the composition of link chain ring and elastomeric ring of the elastomeric loop may be utilized better or more completely when the diameter of the ring of the link chain ring is larger than the diameter of the ring of the elastomeric cord ring in its relaxed state.

The link chain ring is reduced to the diameter of the elastomeric cord ring by the position of the individual chain links of the link chain ring that do not lie straight within the elastomer but are angularly disposed to each other at least in sections and that by forming preferably a sawtooth line that is at least substantially regular. The angle formed by two adjacent chain links of the sawtooth ring line formed by the order of the chain links lies preferably in the range of between approximately 20° and 90° and depends individually as well upon the parameters of the elastomer, particularly on the hardness of the elastomer as also on the lengths of the individual chain links. Optimal values for each special case are easily obtainable. The following standard is valid for such determinations: at a hardness of the elastomer in the region of about 50 to 60 Shore A and a length of the individual chain links of 4 mm and a diameter of the ring of the elastomeric loop in the range of about 5 cm, each angle formed by two adjacent chain links lies approximately in the range of between 40° and 50°. The angles become progressively smaller the softer the elastomer is compounded and reversively, with harder elastomeric compositions, the larger must be the angle formed by the individual chain links of the angularly disposed link chain. On the other hand, the longer the individual chain links, the larger the kinking angle of the sawtooth line.

Best results are obtained when the link chain is disposed in a stretched condition in those regions corresponding to the run of the elastomeric cord of the elastomeric ring where the mountings act upon the elastomeric loop, such mountings transferring the loads to the elastomeric loop. Simultaneously, the link chain remains at least essentially in an alternatingly regular sawtooth curve in the remaining sections of the elastomeric loop.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
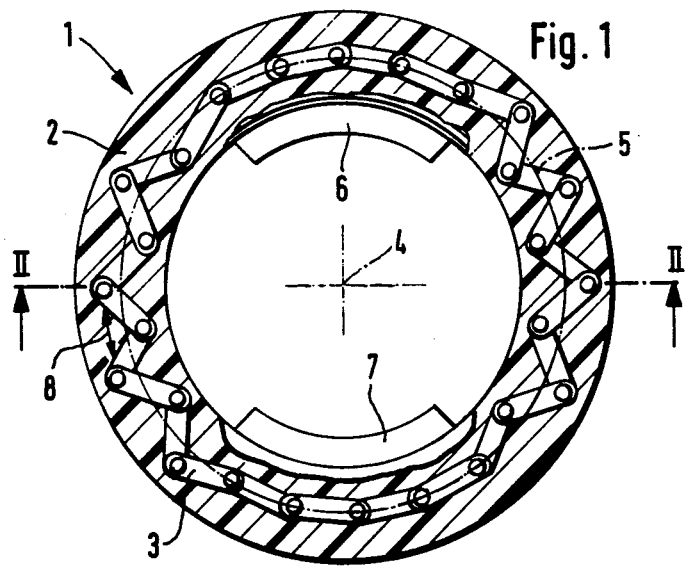
FIG. 1 is a schematic, radial sectional view of an elastomeric loop according to one embodiment of the invention.
Figure 2:
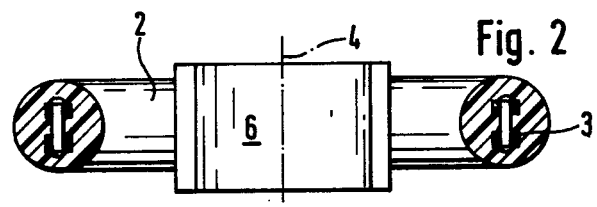
FIG. 2 is a sectional view along II—II in FIG. 1.

The elastomeric loop 1 shown in FIG. 1 in radial section and in FIG. 2 in an axial section is a composite body consisting of an annular endless elastomeric cord 2 and a link chain 3 embedded in the elastomeric cord 2 and completely surrounded by the elastomeric cord 2. The link chain 3 is a stud chain which is also annularly endless. The link chain 3 is arranged coaxial to the central axis 4 of the ring plane and coaxial to the central axis 5 of the ring cord 2. The constructional parts which are dampened relative to each other act upon the elastomeric loop 1 by means of mountings 6, 7.

The maximum ring diameter of the central or median line of link chain 3 and thus the diameter of link chain 3 at stretched conditions of the chain links is considerably larger than the ring diameter of the central axis or median line 5 of the ring cord 2 in the relaxed state of the elastomer. By angularly alternatingly disposing of individual chain links of link chain 3, the mean diameter of link chain 3 is reduced down to the diameter of the central axis 5 of the ring cord 2. Thus the link chain forms an at least substantially regular sawtooth ring line. This is shown by the angle 8 in FIG. 1 and is regularly formed by every two adjacent chain links but not shown in its true value, but rather enlarged in order to be easier seen.

In the bearing regions of the load mountings 6, 7 the chain links of the link chain 3 embedded in the elastomeric cord 2 are not angularly disposed in zig-zag fashion in contradistinction to the rest of the sections of elastomeric loop 1 but rather are stretched. This arrangement diminishes the extensibility of the elastomeric loop 1 in the region of the load mountings 6, 7 and thereby contributes to the extension of the service life of the elastomeric loop 1. The characteristic spring line of an elastomeric loop of the kind shown in FIGS. 1 and 2 is shown in its typical course in FIG. 3. After a relatively broad proportionality area A, there follows a smooth but not abruptly rising progressive area B, which then becomes a steep and almost vertically rising section C.

Figure 3:
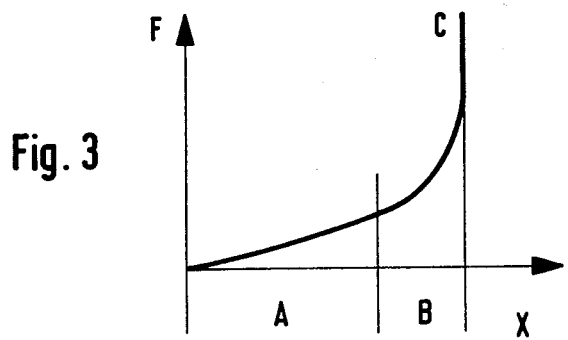
FIG. 3 is a spring characteristic curve of the elastomeric loop shown in FIGS. 1 and 2.

Samples of the elastomeric loop shown in FIGS. 1 and 2 were exposed in a testing machine to almost 3 million extension cycles where each extension was applied almost to the upper limit of progressive area B (FIG. 3). None of the elastomeric loops showed any effects of wear or any fatigue effects larger than the normal fatigue shown by all elastomers. Particularly the course and the position of the spring characteristic line in the progressive area B and in the rise area C remained unchanged. The adhesion promotor for priming or coating the link chain ring for example may be a natural rubber adhesive composition.

What we claim is:

1. A suspension device comprising a closed loop of elastomeric material, and a closed loop link chain embedded within said elastomeric material, said link chain having a diameter, when stretched into a circle, which is larger than the median diameter of said closed loop of elastomeric material when in its relaxed state, said link chain having a plurality of pivotally joined links of which at least some are disposed in sawtooth fashion with non-straight angles between adjacently joined links.

2. A suspension device according to claim 1, wherein said link chain is lockingly embedded within and completely enclosed by said elastomeric material.

3. A suspension device according to claim 1, wherein said closed loop of elastomeric material has the configuration of an annular ring, and said link chain is disposed about an axis which is substantially coaxial with the axis of said annular ring of elastomeric material.

4. A suspension device according to claim 1, wherein said closed loop of elastomeric material has a toroidal configuration.

5. A suspension device according to claim 1, wherein said closed loop of elastomeric material has a circular cross-sectional configuration.

6. A suspension device according to claim 1, wherein said link chain comprises links joined by pins.

7. A suspension device according to claim 6 further comprising bushings on said pins.

8. A suspension device according to claim 1, wherein a plurality of said links are joined with substantially the same non-straight angle when the device is in its relaxed state.

9. A suspension device according to claim 1, wherein said non-straight angle is within the range of from 20 to 90 degrees.

10. A suspension device according to claim 1, wherein said device is used for supporting exhaust systems of motor vehicles.

11. A suspension device according to claim 1, wherein said device is used for supporting exhaust pipes of motor vehicles.

12. A suspension device according to claim 1, wherein said device is used for supporting mufflers of motor vehicles.

13. A suspension device comprising a closed loop of elastomeric material, a closed loop link chain embedded within said elastomeric material, and support mountings extending along portions of the inner periphery of said closed loop of elastomeric material, said link chain extending in its stretched condition in the areas adjacent said support mountings.

14. A suspension device according to claim 13, wherein said link chain follows generally the contour of said closed loop elastomeric material in the areas adjacent said support mountings.

15. A suspension device according to claim 13, wherein said device is used for supporting exhaust system of motor vehicles.

* * * * *